A. E. TERRY.
GEAR WHEEL.
APPLICATION FILED MAY 28, 1914.

1,183,328.

Patented May 16, 1916.

Witnesses:

Inventor:
Alfred E. Terry

UNITED STATES PATENT OFFICE.

ALFRED ERNEST TERRY, OF REDDITCH, ENGLAND.

GEAR-WHEEL.

1,183,328.  Specification of Letters Patent.  Patented May 16, 1916.

Application filed May 28, 1914. Serial No. 841,659.

*To all whom it may concern:*

Be it known that I, ALFRED ERNEST TERRY, a subject of the Kingdom of Great Britain, residing at Novelty Works, Redditch, in the county of Worcester, England, have invented certain new and useful Improvements in or Relating to Gear-Wheels, of which the following is a specification.

This invention relates to gear wheels composed of a series of laminæ or plates each furnished with teeth, and which plates are assembled with the teeth in a staggered arrangement, according to which the teeth of one disk may, for instance, occupy positions laterally opposite to spaces between the teeth of the adjacent disk. In such an arrangement the resultant wheel may have a series of spaced teeth arranged in an axial row across the periphery of the wheel, and which series of spaced teeth is repeated around the circumference of the wheel at intervals of one half of the pitch dimension. In such an arrangement when two such wheels mesh together, the projections on one wheel are adapted for the most part to take into a space surrounded by four projections on the other wheel, of the four projections one occupying a position circumferentially in front of, and another, a position circumferentially to the rear of, the projection upon the first wheel, and the two other projections being adapted to occupy positions laterally one on each side of the projection upon the first wheel. In such an arrangement the space between the lateral projections is of width exactly corresponding with that of the thickness of the sheet metal of the plates, so that when a projection takes into this space, its width laterally or transversely fills completely and exactly the space into which it takes. According to the present invention, in such a wheel the plates are set or assembled with intermediate spacing portions, one of which spacing portions may be placed between each adjacent pair of disks, and by the use of the said spacing portions, any possibility of friction occurring at the lateral faces of the teeth is avoided, while less care is necessary in the setting of the plates and wheels, and in maintaining the plates and wheels in such coöperation when at work that friction is avoided at the lateral faces of the teeth.

In order that this invention may be clearly understood and readily carried into practice, reference may be had to the appended explanatory sheet of drawings, upon which:—

Figure 1:
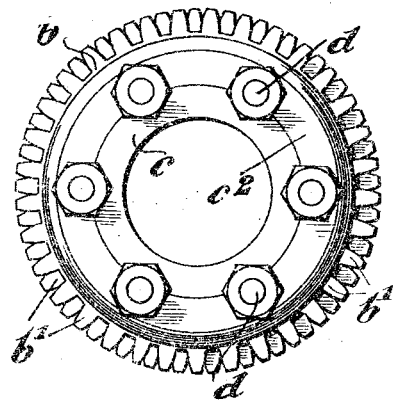
Figure 2:
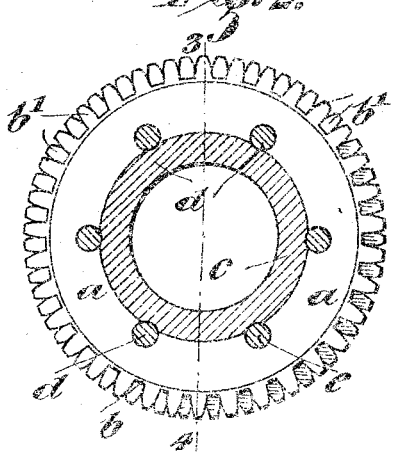
Figure 3:
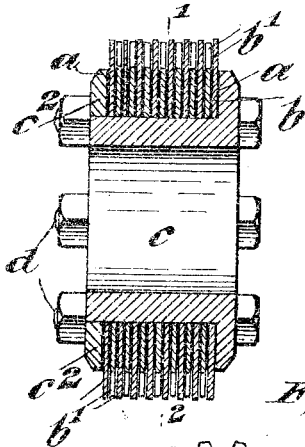
Figures 4, 4A:
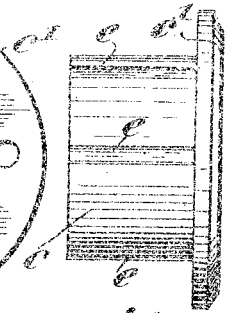
Figures 5, 5A:
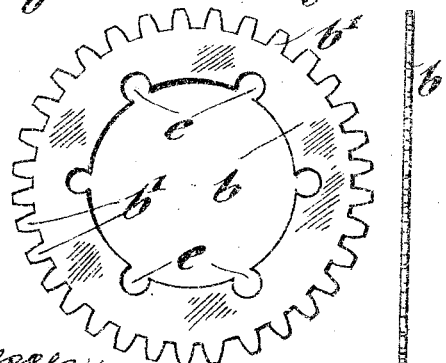
Figures 6, 6A:
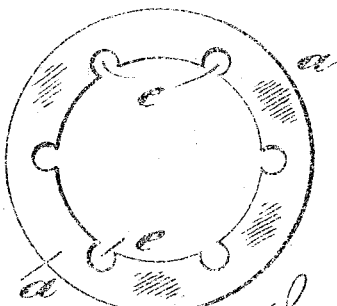

Figure 1 is a side view of a wheel constructed according to the present invention. Fig. 2 is a sectional view of the wheel shown in Fig. 1, the plane of section being on the line 1—2 of Fig. 3. Fig. 3 is a section of the wheel shown in Figs. 1 and 2, the plane of section being on the line 3—4 of Fig. 2. Fig. 4 is a side view of the hub and integral flange shown in section in Fig. 3. Fig. 4ᵃ is a view of the members shown in Fig. 4 taken at right angles to Fig. 4. Fig. 5 is a side view of one of the plates or laminæ which are assembled on the hub to form my improved gear wheel. Fig. 5ᵃ is an end view of the member shown in Fig. 5. Fig. 6 is a side view of one of the spacing disks assembled between the toothed disks in making up my improved gear wheel. Fig. 6ᵃ is an end view of the member shown in Fig. 6.

In a convenient method of carrying out the present invention, I may employ disks $a$ of sheet of thin sheet metal, paper, or other material, which may be placed between the plates or laminæ $b$. The spacing plates $a$ are not furnished with teeth $b^1$ but their outer circumferences correspond with, or are advantageously of a little less diameter than, the circumferences of the bases of the teeth $b^1$. By incorporating the intermediate sheet metal or other plates $a$, the lateral spaces between the projections slightly exceed in width the lateral thickness of each tooth, and thus a tooth of one wheel is enabled to pass laterally between two teeth of another wheel without any contact or friction being incurred at the lateral faces of the teeth.

In certain embodiments of the invention the distance plates may instead of being employed between all of the toothed plates be only employed between certain of the toothed plates. Thus an arrangement may be employed in which the toothed plates are assembled in pairs with the teeth of each plate of the pair opposite to each other so that each pair in fact results in a laminated plate. Such a lamina or plate may be employed in conjunction with other laminated plates with the teeth of the respective laminated plates in a staggered arrangement, in which arrangement the distance pieces may be employed only between the laminated plates and not between the two layers of which each plate is composed.

In assembling the wheel, the toothed plates $b$ as well as the separating disks $a$ may be assembled around a tubular boss $c$ forming the central part or hub of the gear wheel, which boss $c$ may be furnished at one extremity with an integral flange $c^1$ extending outwardly to a diameter advantageously corresponding with, or slightly less than, that at the bases of the teeth. A separable flange $c^2$ is assembled around the extremity of the boss at the other side of the laminated portion of the wheel, and bolts or other connecting elements $d$ are passed through the integral and separable flanges of the boss, and also through the laminated plates $b$ and distance disks $a$, the said bolts $d$ being tightened to draw the parts effectively together and so produce a rigid composite wheel. The holes $e$ for accommodating the shanks of the bolts $d$, and which pass through the end flanges $c^1$, $c^2$ and also through the plates $b$ and distance disks $a$ may also be partly formed in the central boss $c$ so that the shanks of the bolts form keys which more effectively prevent any possibility of movement of the toothed plates $b$ and the separating disks $a$ in relation to the boss or hub $c$. The separating annuli $a$ advantageously have their inner diameters corresponding with the outer or external diameter of the central boss $c$, as in the case of the toothed disks $b$, but if desired the inner diameters of the separating annuli $a$ may be greater; thus each inner diameter may correspond with a diameter, the circle of which just incloses the shanks of the bolts, and which shanks are thereby enabled to prevent movement of the distance disks or annuli $a$ out of concentricity with the toothed annuli.

What I claim as my invention and desire to secure by Letters Patent is:—

A gear wheel comprising in combination, a series of laminæ or plates having teeth thereon, said plates being arranged in such manner that the teeth of one disk occupy position in axial alinement with the spaces between the teeth of an adjacent disk, whereby the wheel has a series of spaced teeth arranged in a line extending axially across the periphery of the wheel and similar axial lines of teeth disposed around the circumference of the wheel at intervals of one-half of the pitch distance, spacing members arranged between the plates having the teeth, a central member on which said plates are assembled, and having grooves therein, and members for clamping said plates together and lying partly in said grooves, said clamping members projecting into said plates.

In witness whereof I have hereunto set my hand in the presence of two witnesses.

ALFRED ERNEST TERRY.

Witnesses:
   BERT J. FIN RIES,
   ALFRED H. SMITH.